US010605658B2

(12) United States Patent
Yoon et al.

(10) Patent No.: US 10,605,658 B2
(45) Date of Patent: Mar. 31, 2020

(54) SPECTROMETER

(71) Applicant: SAMSUNG ELECTRONICS CO., LTD., Suwon-si (KR)

(72) Inventors: Youngzoon Yoon, Hwaseong-si (KR); Hyochul Kim, Yongin-si (KR); Younggeun Roh, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/935,193

(22) Filed: Mar. 26, 2018

(65) Prior Publication Data
US 2019/0101444 A1 Apr. 4, 2019

(30) Foreign Application Priority Data

Sep. 29, 2017 (KR) .......... 10-2017-0128291

(51) Int. Cl.
G01N 21/25 (2006.01)
G01J 3/02 (2006.01)
G01J 3/28 (2006.01)
G01J 3/44 (2006.01)
G01J 3/12 (2006.01)

(52) U.S. Cl.
CPC ............. *G01J 3/0208* (2013.01); *G01J 3/021* (2013.01); *G01J 3/0216* (2013.01); *G01J 3/0229* (2013.01); *G01J 3/0256* (2013.01); *G01J 3/0262* (2013.01); *G01J 3/0264* (2013.01); *G01J 3/2803* (2013.01); *G01J 3/2823* (2013.01); *G01J 3/44* (2013.01); *G01J 3/0291* (2013.01); *G01J 2003/1213* (2013.01); *G01J 2003/2806* (2013.01)

(58) Field of Classification Search
CPC ........ G01J 3/26; G01J 3/02; G01J 3/51; G01J 9/00; G01N 21/255
USPC ........................................... 356/416
See application file for complete search history.

(56) References Cited

U.S. PATENT DOCUMENTS

| 9,234,839 B2 | 1/2016 | Hruska et al. |
| 9,316,628 B2 | 4/2016 | O'Brien et al. |
| 9,891,105 B2 | 2/2018 | Shiraiwa |
| 2002/0085384 A1 | 7/2002 | Tiesler-Wittig |
| 2012/0080611 A1* | 4/2012 | Jones ............... G01J 1/0242 250/458.1 |
| 2018/0038784 A1* | 2/2018 | Marks ............. G01N 15/1425 |
| 2018/0274977 A1 | 9/2018 | Baik et al. |

FOREIGN PATENT DOCUMENTS

| KR | 101139401 B1 | 4/2012 |
| KR | 1020130084718 A | 7/2013 |
| KR | 1020170026196 A | 3/2017 |

* cited by examiner

*Primary Examiner* — Md M Rahman
(74) *Attorney, Agent, or Firm* — Sughrue Mion, PLLC

(57) ABSTRACT

A spectrometer includes a light conduit configured to align scattered light scattered in a target by light output from a light source into a collimated beam, and a beam block configured to restrict an angle of the scattered light and detect the scattered light via the light conduit or the beam block through a filter array and a detector, thereby achieving miniaturization in a pen type or a flat plate shape while maintaining a spectral characteristic.

14 Claims, 18 Drawing Sheets

SPECTROMETER

RELATED APPLICATION

This application claims priority from Korean Patent Application No. 10-2017-0128291, filed on Sep. 29, 2017 in the Korean Intellectual Property Office, the disclosure of which is incorporated herein by reference in its entirety.

BACKGROUND

1. Field

Apparatuses and methods consistent with exemplary embodiments relate to an optical device, and more particularly to, an integrally manufactured spectrometer.

2. Description of the Related Art

A spectrometer may radiate light having a certain electromagnetic spectrum to a human subject, and may be used in analyzing components of various compounds or measuring various chemical and physiological states of the human subject. For example, a spectrometer system may be applied to a health condition measuring device that measures a physiological condition such as blood sugar or cholesterol, or a device that measures a state of food in a refrigerator. Demand for miniaturization of such a spectrometer is increasing for various utilization possibilities.

SUMMARY

One or more exemplary embodiment provide spectrometers suitable for miniaturization.

Further, one or more exemplary embodiment provide on-chip spectrometers combining an entire spectrometer system, such as a light source, and a part that aligns scattered light.

According to an aspect of an exemplary embodiment, there is provided a spectrometer including: a light source configured to emit a light to a target; a light conduit comprising a measurement hole through which the light scattered by the target is incident, an inner surface configured to condense the light incident on the measurement hole into a collimated beam, and an output hole configured to output the light condensed by the inner surface; a detector configured to detect the light output from the output hole of the light conduit; and a filter array comprising filters arranged on a detection surface of the detector and transmitting a predetermined wavelength band of the light output from the output hole of the light conduit.

An inner surface of the light conduit may be a hyperboloidal reflection surface.

The spectrometer may further include: a lens disposed in a path of the light that is incident through the measurement hole.

The inner surface of the light conduit may be a parabolic reflection surface.

The spectrometer may further include: a beam splitter configured to direct the light emitted from the light source toward the output hole of the light conduit and direct the light output from the output hole of the light conduit toward the detector.

The beam splitter may be a dichroic mirror or a dichroic prism.

The light source may be a narrowband wavelength light source or a wideband wavelength light source.

The filter array may include a nanostructure layer in which nanostructures are periodically arranged, and first and second reflective layers provided on front and back surfaces of the nanostructure layer, respectively.

The detector may be an image sensor, a photodiode array, or a phototransistor array.

The spectrometer may further include a housing configured to mount the light source, the detector, and the filter array, and the light conduit may protrude from the housing and has a pen type appearance.

According to an aspect of another exemplary embodiment, there is provided a spectrometer including: a light source configured to emit a light to a target; a beam block configured to restrict an angle of the light scattered by the target; a detector array including detector cells configured to detect the light restricted by the beam block; and a filter array including filters arranged on a detection surface of the detector array and transmitting a predetermined wavelength band of the light restricted by the beam block.

The light source may be disposed on a back surface of the detector array, and each of the detector cells and the filters may include a through hole through which the light emitted from the light source passes.

The beam block may include a block end configured to define openings and a support configured to support the block end.

Each of the openings defined by the block end may be smaller than an area of the filter.

The support may have a barrier rib structure that prevents the light scattered by the target from being incident onto a neighboring cell that is disposed adjacent to the detector cells.

The light source, the detector array, the spectrometer, and the beam block may be coupled together in a flat plate shape.

The spectrometer may further include: a driver circuit configured to drive the light source and the detector.

The spectrometer may further include: a wireless or wired communication module configured to communicate with an external electronic device.

According to an aspect of another exemplary embodiment, there is provided a spectrometer system including: a spectrometer; and a data receiver configured to collect data received from the spectrometer.

The data receiver may be a spectral analyzer, a cloud server, a mobile phone, a laptop computer, a personal computer, a server, medical equipment, or experiment equipment.

According to an aspect of another exemplary embodiment, there is provided a spectrometer including: a light source configured to emit a light to a target; a light detector configured to detect the light that returns from the target; a beam splitter that is disposed between the light detector and the target, and configured to change a direction of the light emitted from the light source so that the light travels toward the target; a light conduit that protrudes from an outer surface of the spectrometer, extends in the changed direction of the light, and comprises a hole through which the light having the changed direction exits the spectrometer.

The spectrometer may further include a lens disposed in a path that the light travels from the beam splitter to the light conduit and returns from the target to the beam splitter.

The light conduit may include a reflecting inner surface that reflects the light when the light is scattered by the target and strikes the reflecting inner surface.

The light conduit may have a parabolic shape.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
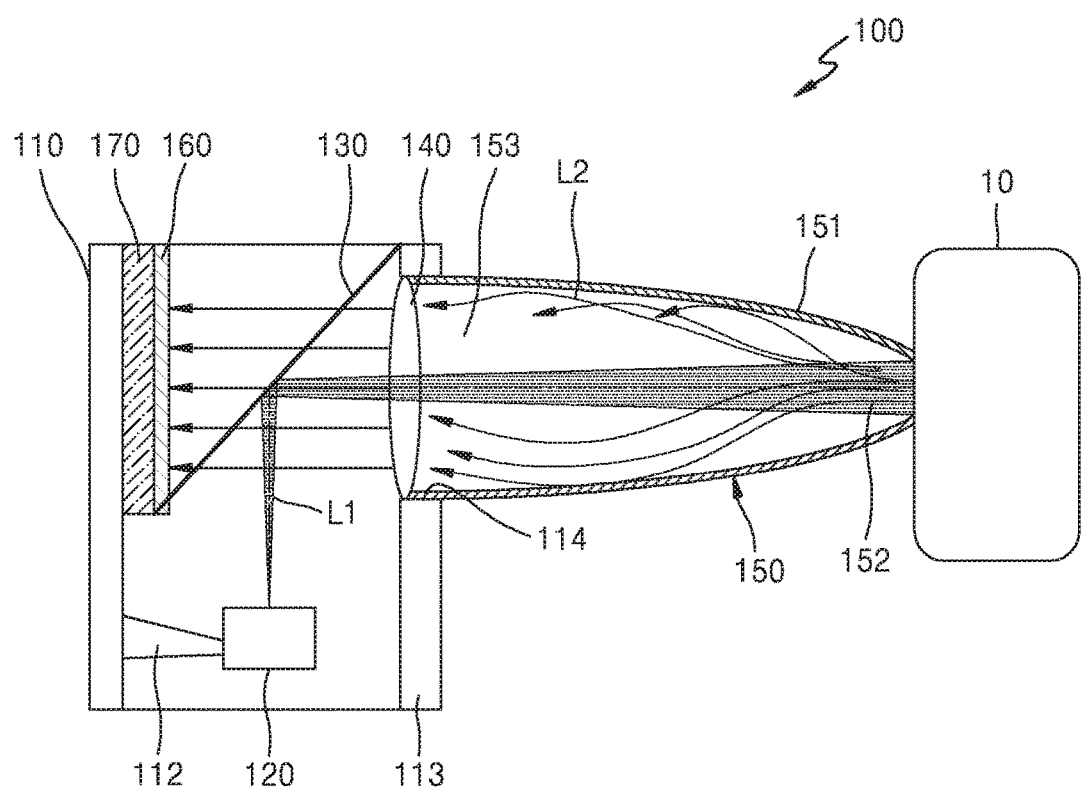
FIG. 1 is a schematic view of a spectrometer according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

First, the terms used in the present disclosure will be briefly described below before embodiments of the present disclosure are described in greater detail.

Most of the terms used herein are general terms that have been widely used in the technical art to which the present disclosure pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present disclosure.

Throughout the specification, when a portion "includes" an element, another element may be further included, rather than excluding the existence of the other element, unless otherwise described.

Expressions such as "at least one of," when preceding a list of elements, modify the entire list of elements and do not modify the individual elements of the list.

Figure 2:
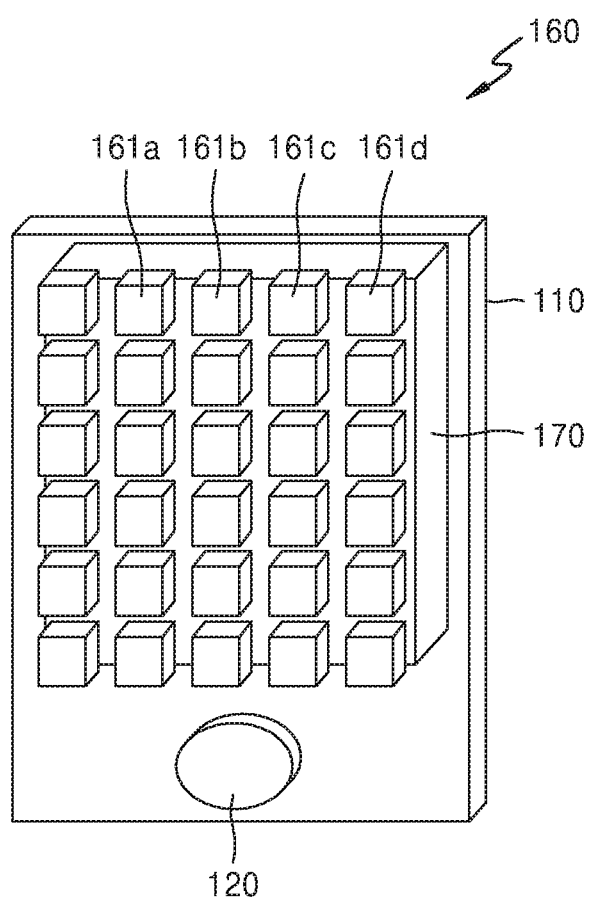
FIG. 2 is an enlarged view of a light source, a filter array, and a detector of the spectrometer of FIG. 1.
Figure 3:
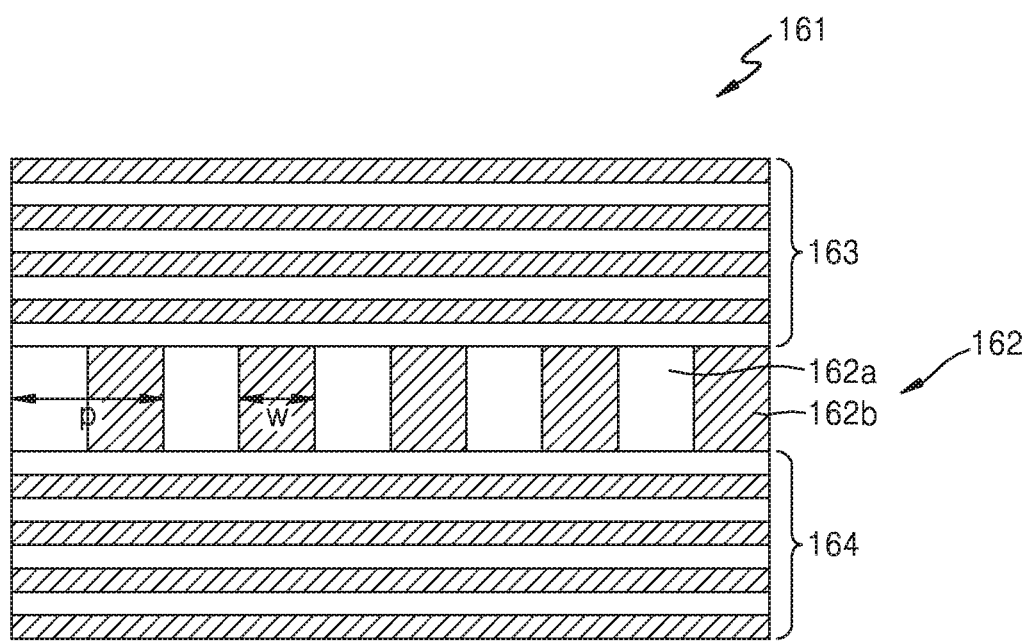
FIG. 3 is an enlarged view of a filter array of the spectrometer of FIG. 1.
Figure 4:
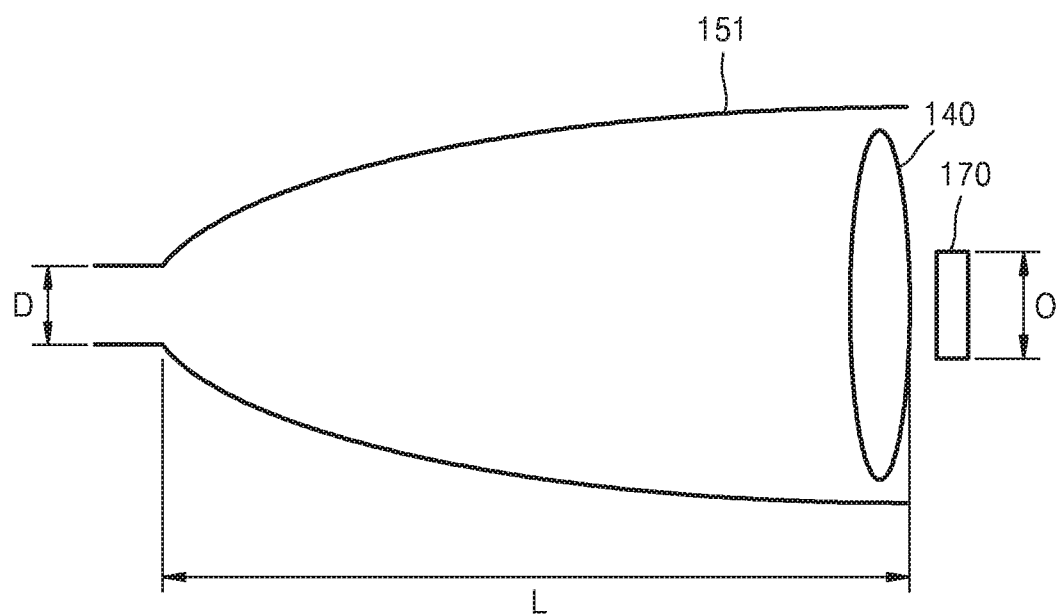
FIG. 4 is a cross-sectional view of a light conduit, a lens, and the detector of the spectrometer of FIG. 1.

FIG. 1 is a schematic view of a spectrometer 100 according to an embodiment. FIG. 2 is an enlarged view of a light source 120, a filter array 160, and a detector 170 of the spectrometer 100 of FIG. 1. FIG. 3 is an enlarged view of a filter array 160 of the spectrometer 100 of FIG. 1. FIG. 4 is a cross-sectional view of a light conduit 150, a lens 140, and the detector 170 of the spectrometer 100 of FIG. 1.

Referring to FIG. 1, the spectrometer 100 of the present exemplary embodiment includes the light source 120, a beam splitter 130, the lens 140, the light conduit 150, the filter array 160, and the detector 170.

The light source 120, the beam splitter 130, the filter array 160, and the detector 170 may be mounted inside a housing 110. An opening 114 is provided in a front portion 113 of the housing 110. The lens 140 may be disposed in the opening 114. The filter array 160 and the detector 170 may be disposed on an inner surface of the housing 110 facing the opening 114. The beam splitter 130 is disposed between the filter array 160 and the opening 114. The light source 120 is disposed in one side of the inside of the housing 110. The light conduit 150 is disposed outside the opening 114. In FIG. 1, the lens 140 is illustrated as being fitted into the opening 114, but the present exemplary embodiment is not limited thereto. For example, the lens 140 may be disposed outside the light conduit 150 and in the path through which a light that is emitted from the light source 120 travels toward a target 10 and then returns to the filter array 160 after being scattered or reflected from the target 10.

The light source 120 may be a light source that emits light L1 having a specific wavelength or a narrowband wavelength according to the use of the spectrometer 100. For example, the light source 120 may be a short wavelength light-emitting diode, a short wavelength laser diode, or an array or lamp thereof. When the light L1 emitted from the light source 120 has a single wavelength, the spectrometer 100 may measure Raman scattering light.

The light source 120 is disposed such that the emitted light L1 is directed to the beam splitter 130. The light source 120 may be supported by a light source support 112 to maintain a predetermined emission angle. As will be described below, the light source 120 may be manufactured integrally on one chip together with the filter array 160 and the detector 170, but not limited thereto.

The beam splitter 130 may be an optical device, such as a dichroic mirror or a dichroic prism, that reflects light of a predetermined wavelength band and transmits light other than the predetermined wavelength band. The predetermined wavelength band may be understood as a wavelength band of the light L1 emitted from the light source 120. As will be described below, since at least a part of scattered light L2 scattered in a target 10 is Raman scattered light deformed in the wavelength of the light L1 radiated before scattering, the beam splitter 130 may emit the light L1 emitted from the light source 120 and transmit at least a part of the scattered light L2 scattered in the target 10, that is, the Raman scattered light. The beam splitter 130 is disposed such that the light L1 emitted from the light source 120 is directed to the target 10 via the beam splitter 130 and the scattered light L2 scattered in the target 10 is directed to the detector 170. For example, if the beam splitter 130 is a planar dichroic mirror, the beam splitter 130 may be disposed at an angle of 45 degrees with respect to the light L1 emitted from the light source 120 such that the light L1 is substantially perpendicularly incident to the target 10.

The light conduit 150 may be an optical device that gathers the scattered light L2 scattered in the target 10. For example, the light conduit 150 may be a hyperboloidal collimator as shown in FIG. 2. The light conduit 150 may have a hollow center or tube and include an inner surface 151 having a longitudinal section in a hyperbolic shape. That is, the inner surface 151 is defined by a hyperboloid in a three-dimensional (3D) space. The inner surface 151 may be a polishing processed surface or a reflecting coated surface. The light conduit 150 may include a measurement hole 152 and an output hole 153. The measuring hole 152 is formed in a region where a transverse axis of the hyperboloid and the hyperboloid meet. The transverse axis is an axis through which two focuses of a hyperbola pass. The output hole 153 is formed on the opposite side of the measurement hole 152. The measurement hole 152 may be in contact with or adjacent to the target 10. The light conduit 150 gathers the scattered light L2 incident on the measurement hole 152 and emits the gathered light L2 to the output hole 153.

The lens 140 is positioned between the output hole 153 of the beam splitter 130 and the beam splitter 130. The lens 140 focuses the light L1 emitted from the light source 120 and focuses the scattered light L2 passing through the output hole 153 within a predetermined angle. It may be understood that the lens 140 aligns the scattered light L2 as a collimated beam along with the hyperboloidal collimator type light conduit 150.

Figure 5:
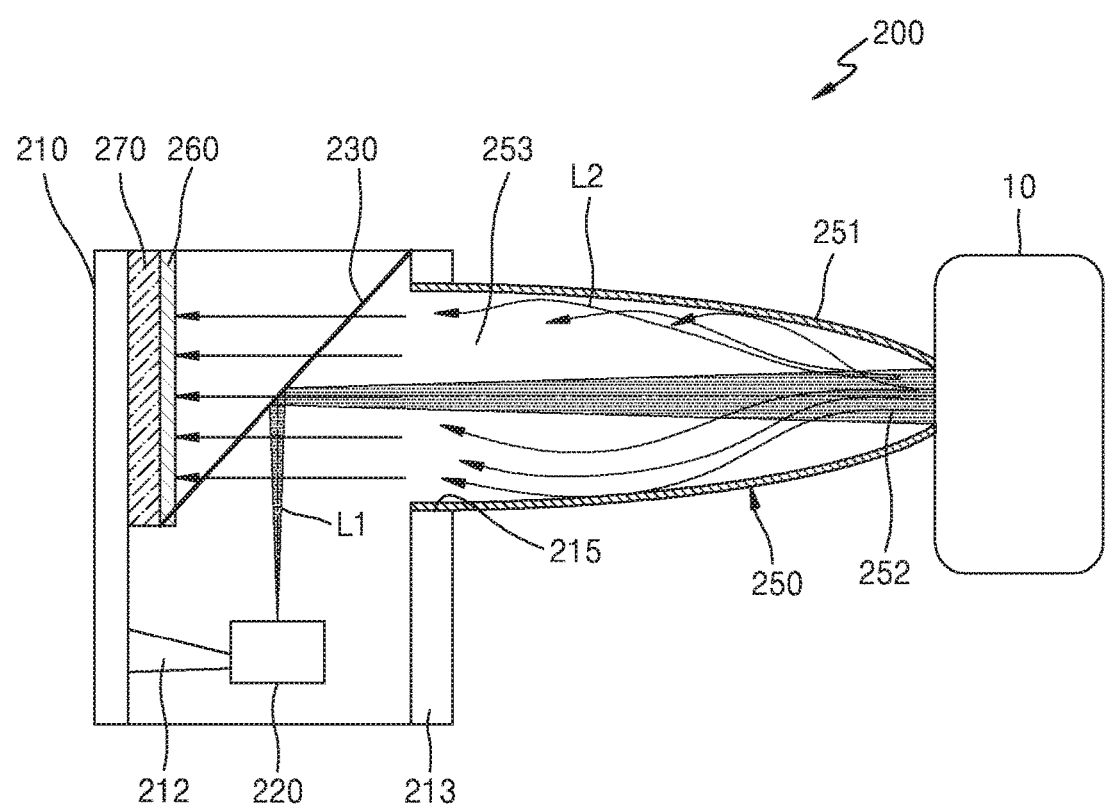
FIG. 5 is a schematic view of a spectrometer according to another exemplary embodiment.

Due to the combination of the lens 140 and the light conduit 150, the hyperboloidal collimator type light conduit 150 may be more advantageous for emitting the light L1 and collecting the scattered light L2, compared to a parabolic collimator-type light conduit 250 according to another exemplary embodiment in FIG. 5, because the size of the measurement hole 152 of the hyperboloidal collimator-type light conduit 150 may be larger than the size of a measurement hole of the parabolic collimator-type light conduit 150 when it is assumed that both of the output holes 153 and 253 have the same size. Also, a length of the light conduit 150 may be shortened with respect to the output hole 153 of the same size as compared with the parabolic collimator type light conduit 250 that will be described below.

If the scattered light L2 spreads without being gathered within a certain angle, a spectral characteristic of the detector 170 disappears and a signal-to-noise ratio (SNR) deteriorates. In this case, the lens 140 and the light conduit 150 of the present embodiment align the scattered light L2 as a collimated beam, thereby improving the spectral characteristic of the detector 170.

The detector 170 may be an image sensor, a photodiode array, or a phototransistor array.

The filter array 160 may include two-dimensionally arranged filters 161a, 161b, 161c, and 161d on an incident surface of the detector 170. Each of the filters 161a, 161b, 161c, and 161d may be a band-pass filter that passes only light of a predetermined wavelength band. At least some of the filters 161a, 161b, 161c, and 161d may have pass bands of different wavelengths.

Referring to FIG. 3, each filter 161 of the filter array 160 may include a nanostructure layer 162 and first and second reflective layers 163 and 164 provided on front and back surfaces of the nanostructure layer 162, respectively. The nanostructure layer 162 may be a layer in which nano-sized nanostructures 162b are arranged at a cyclic period P. For example, the nanostructure 162b may be a Si oxide such as $SiO_2$, and a heterogeneous material 162a filling a circumference of the nanostructure 162b may be a Ti oxide such as $TiO_2$. A transmission band may be adjusted according to a width W, the cyclic period P, and a height of the nanostructure 162b. The first and second reflective layers 163 and 164 may each be a distributed Bragg reflector (DBR) layer in which heterogeneous materials having different refractive indexes are alternately stacked. For example, the first and second reflective layers 163 and 164 may be formed by alternately stacking a Si oxide such as $SiO_2$ and a Ti oxide such as $TiO_2$. At this time, a reflection characteristic may be adjusted by adjusting thicknesses, numbers of layers, and refractive indexes of the stacked layers. The filter 161 including the nanostructure layer 162 and the first and second reflective layers 163 and 164 may adjust a resonance mode by using a nanostructure or a layer structure, thereby selectively transmitting only a wavelength of a region of interest and distributing light.

The filter array 160 may be manufactured integrally with the detector 170 on a semiconductor manufacturing process. Alternatively, the filter array 160 may be attached to the incident surface of the detector 170 after the filter array 160 and the detector 170 are respectively manufactured. Also, the filter array 160 and the detector 170 may be integrally manufactured on a single chip together with the light source 120.

The spectrometer 100 of the present exemplary embodiment may have an appearance where the light conduit 150 protrudes and may have a small size that may be held by a hand. Further, when the light source 120, the filter array 160, and the detector 170 are integrally manufactured on one chip, the spectrometer 100 may have a pen-type micro-sized appearance.

The spectrometer 100 of the exemplary embodiment described with reference to FIGS. 1 to 4 has been described by taking the case of measuring the Raman scattering light as an example, but is not limited thereto. The light source 120 may be a light source that emits the light L1 of a multi-wavelength or a wideband wavelength according to the use of the spectrometer 100. In this case, the light source 120 may be a multi-wavelength light-emitting diode, a multi-wavelength laser diode, or an array thereof or a lamp. Meanwhile, the beam splitter 130 may be a half-mirror. In this case, a part of the light L1 emitted from the light source 120 is reflected by the beam splitter 130 and radiated to the target 10, and a part of the scattered light L2 from the target 10 passes through the beam splitter 130 and is directed to the filter array 160. When the light source 120 is a light source emitting the light L1 having the multi-wavelength or the wideband wavelength, the spectrometer 100 may be used for measuring an absorption spectrum.

In the description with reference to FIG. 1, the case where the lens 140 is located in the opening 114 is described as an example, but the present disclosure is not limited thereto. The lens 140 may be disposed inside or outside the opening 114.

Also, in the description with reference to FIG. 2, the case where the filter array 160 is attached to the incident surface of the detector 170 is described as an example, but the present disclosure is not limited thereto. The filter array 160 may be spaced apart from the incident surface of the detector 170.

Figure 6:
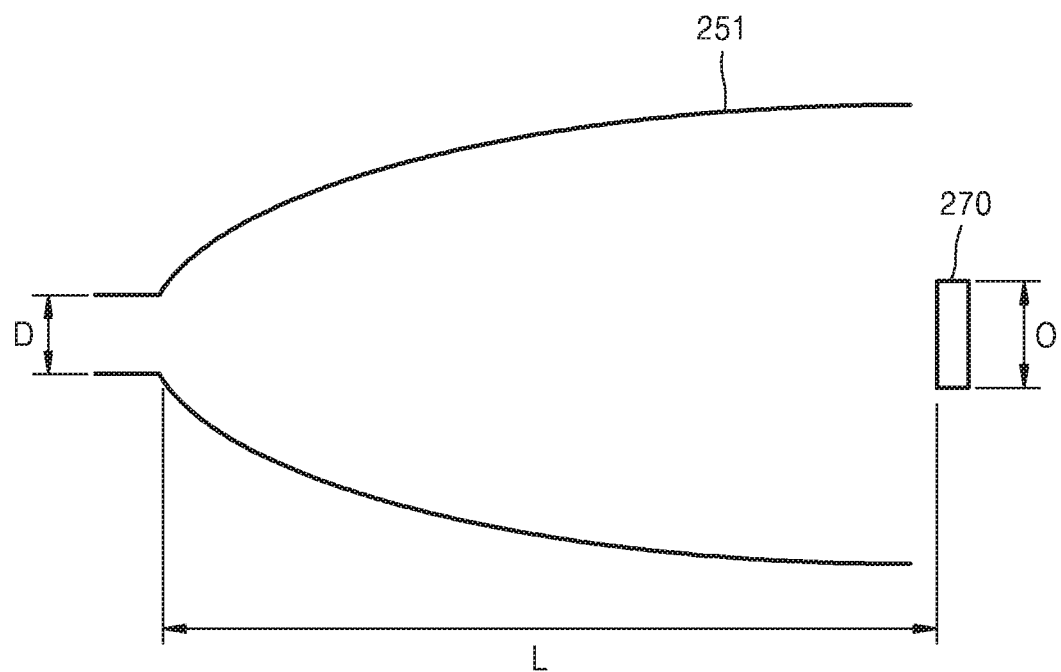
FIG. 6 is an enlarged view of a light conduit and a detector of the spectrometer of FIG. 5.

FIG. 5 is a schematic view of a spectrometer 200 according to another exemplary embodiment. FIG. 6 is an enlarged view of a light conduit 250 and a detector 270 of the spectrometer 200 of FIG. 5.

Referring to FIGS. 5 and 6, the spectrometer 200 of the present exemplary embodiment includes a light source support 212, a front portion 213, an opening 215, a light source 220, a beam splitter 230, a light conduit 250, a filter array 260, and a detector 270. The light source 220, the beam splitter 230, the filter array 260, and the detector 270 may be mounted inside a housing 210. The light source 220, the beam splitter 230, the filter array 260, and the detector 270 are substantially the same as the light source 120, the beam splitter 130, the filter array 160, and the detector 170 of the spectrometer 100 described with reference to FIGS. 1 through 4, respectively, and thus redundant descriptions thereof will be omitted.

The light conduit 250 may be a parabolic collimator. The light conduit 250 may have a hollow center or tube, and may include an inner surface 251 having a longitudinal section in a hyperbolic shape. That is, the inner surface 251 is defined by a parabolic surface. The inner surface 251 may be a polishing processed surface or a reflecting coated surface. The light conduit 250 may include a measurement hole 252 and an output hole 253. The measurement hole 252 is formed in a region where a principal axis of the parabolic surface and the parabolic face meet. The measurement hole 252 is expected to be in contact with or adjacent to the target 10. At this time, the measurement hole 252 is formed such that a region where the light L1 of the target 10 is radiated (e.g., a scattering origin at which scattering occurs due to the radiated light L1) may be located in a focal point of the parabolic surface of the light conduit 250 or in the vicinity thereof. The output hole 253 is formed on the opposite side of the measurement hole 252. The light conduit 250 aligns the scattered light L2 incident from the measurement hole 252 as a collimated beam and emits the aligned light L2 to the output hole 253. The light L1 emitted from the light source 120 is incident on the light conduit 250 through the output hole 253 and is emitted through the measurement hole 252 to be radiated onto the target 10.

The spectrometer 200 of the present exemplary embodiment is advantageous for an alignment of the collimated beam of the scattered light L2 by using the parabolic collimator light conduit 250, but when the scattered light L2 is condensed at a certain angle, a size of the measurement hole 252 is relatively restricted in comparison with the hyperboloidal collimator type light conduit 150 of FIG. 1. That is, assuming the output hole 153 of FIG. 1 have the same size as the output hole 253 of FIG. 5, the size of the measurement hole 252 of the parabolic collimator type light conduit 250 may be smaller than that of the measurement hole 152 of the hyperboloidal collimator type light conduit 150.

Figure 7:
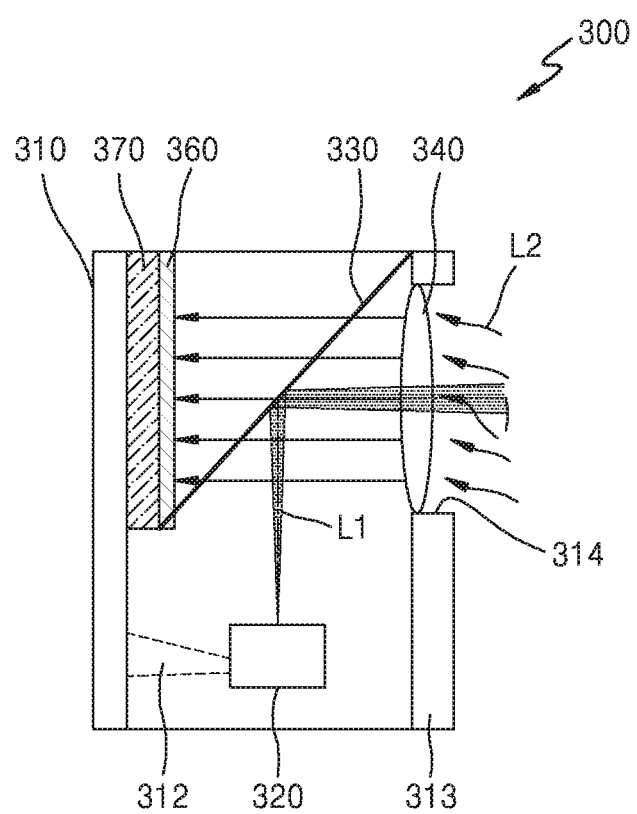
FIG. 7 is a schematic view of a spectrometer according to another exemplary embodiment.

FIG. 7 is a schematic view of a spectrometer 300 according to another exemplary embodiment. Referring to FIG. 7, the spectrometer 300 of the present exemplary embodiment includes a light source support 312, a light source 320, a beam splitter 330, a lens 340, a filter array 360, and a detector 370. The light source 320, the beam splitter 330, the filter array 360, and the detector 370 may be mounted inside a housing 310. An opening 314 is provided in a front portion 313 of the housing 310. The lens 340 may be disposed in the opening 314. The filter array 360 and the detector 370 are disposed on an inner surface of the housing 310 opposite to the opening 314. The beam splitter 330 is disposed between the filter array 360 and the opening 314. The light source 320 is disposed on one side of the inside of the housing 310. The lens 340 focuses the light L1 emitted from the light source 320 and aligns the scattered light L2 scattered by a target 320 within a predetermined angle as a collimated beam. When an alignment (that is, collimation) of the scattered light L2 as the collimated beam is easy or a permissible tolerance for the alignment as the collimated beam is somewhat high according to a surface characteristic of the target, light flux may be aligned only with the lens 340 like the present embodiment. The light source 320, the beam splitter 330, the filter array 360, and the detector 370 are substantially the same as the light source 120, the beam splitter 130, the filter array 160, and the detector 170 of the spectrometer 100 described with reference to FIGS. 1 through 4, respectively, and thus redundant descriptions thereof will be omitted.

Figure 8:
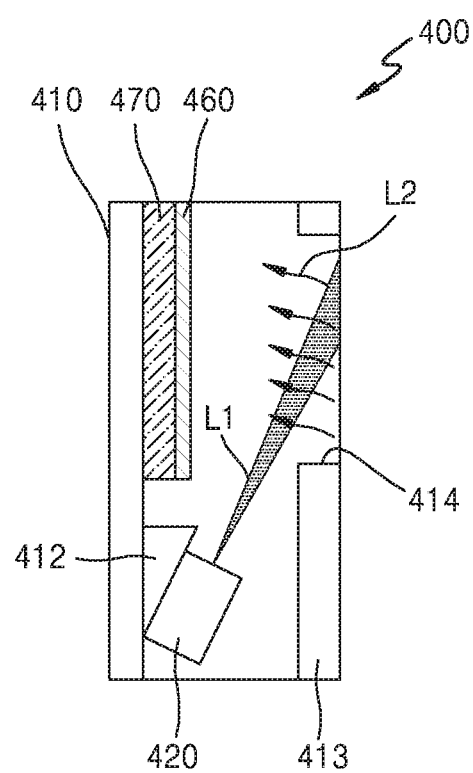
FIG. 8 is a schematic view of a spectrometer according to another exemplary embodiment.

FIG. 8 is a schematic view of a spectrometer 400 according to another exemplary embodiment. Referring to FIG. 8, the spectrometer 400 of the present exemplary embodiment includes a light source 420, a filter array 460, and a detector 470. The light source 420, the filter array 460, and the detector 470 may be mounted inside a housing 410. An opening 414 is provided in a front portion 413 of the housing 410. A transparent window may be disposed in the opening 414. The filter array 460 and the detector 470 are disposed on an inner surface of the housing 410 opposite to the opening 414. The light source 420 is disposed in one side of the inside of the housing 430. The light source 420 may be supported by a light source support 412 to maintain an appropriate emission angle such that the light L1 may be directed to the opening 414. Although the light source 420 is shown in the drawing as being obliquely radiated towards the opening 414 at a great angle, this is only exemplary. The light source 420 is positioned very adjacent to the filter array 460 and the detector 470 such that the light source 420 is radiated to a target that is in approximately in a vertical direction. When an alignment (that is, collimation) of the scattering light L2 as the collimated beam is easier or a permissible tolerance for the alignment as the collimated beam is sufficiently high according to a surface characteristic of the target, a light conduit or a lens may be omitted as in the present embodiment. The light source 420, the filter array 460, and the detector 470 are substantially the same as the light source 120, the filter array 160, and the detector 170 of the spectrometer 100 described with reference to FIGS. 1 to 4, respectively, and thus redundant descriptions thereof will be omitted.

Figure 9:
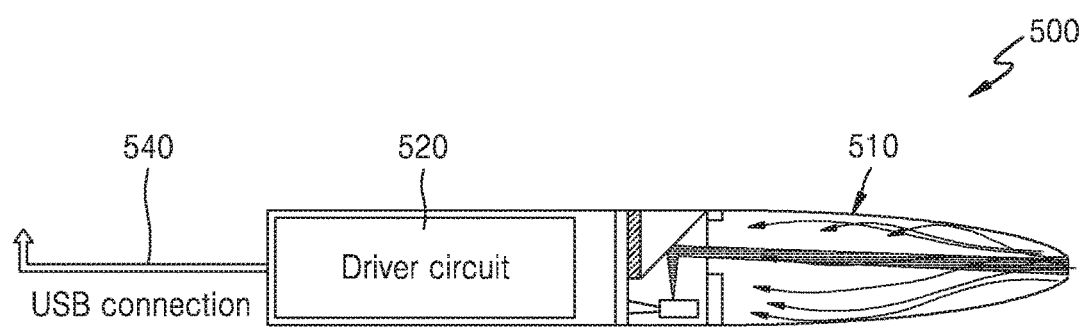
FIG. 9 is a schematic view of a spectrometer according to another exemplary embodiment.

FIG. 9 is a schematic view of a spectrometer 500 according to another exemplary embodiment. Referring to FIG. 9, the spectrometer 500 of the present exemplary embodiment includes a housing 510 having an elongated pen-type appearance. An optical device of the spectrometer described with reference to FIGS. 1 to 8 may be mounted in the housing 510. Further, the spectrometer 500 may have a structure in which up to a driver circuit 520 driving the optical device is mounted in the housing 510. That is, the driver circuit 520 may drive the light source and the detector described with reference to FIGS. 1 to 8. The spectrometer 500 may be connected to an external spectral analyzer via a wired cable 540 to transmit information detected by the spectrometer 500 to the external spectral analyzer or receive a control command from the external spectral analyzer. The spectrometer 500 may include a power switch or other control buttons that may be operated by a user. Also, the spectrometer 500 may further include a display or a display lamp capable of displaying a control state. The spectrometer 500 may or may not have its own built-in battery. In the absence of a built-in battery, power is supplied to the spectrometer 500 through the wired cable 540. The external spectral analyzer may be a mobile device, a laptop computer, a personal computer, a server, medical equipment, experiment equipment, and the like.

Figure 10:
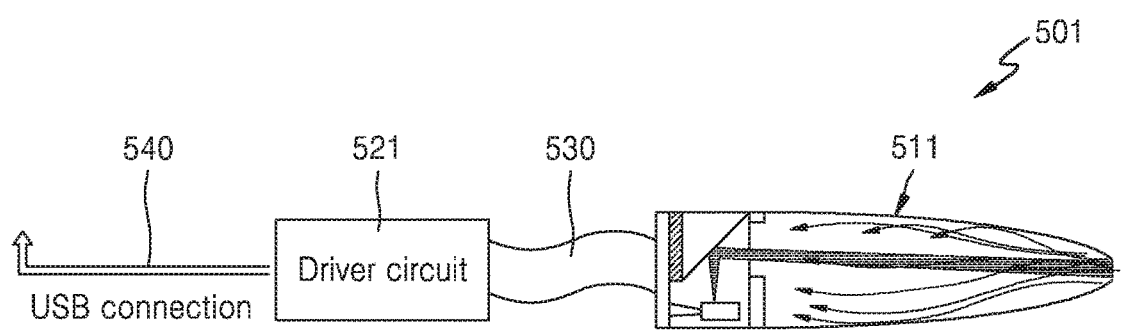
FIG. 10 is a schematic view of a spectrometer according to another exemplary embodiment.

FIG. 10 is a schematic view of a spectrometer 501 according to another exemplary embodiment. Referring to FIG. 10, the spectrometer 501 of the present exemplary embodiment includes an optical device 511 of a spectrometer described with reference to FIGS. 1 to 8 and a driver circuit 521 for driving and controlling the optical device 511. The optical device 511 may have an elongated pen-type appearance. Unlike the spectrometer 500 of the exemplary embodiment described with reference to FIG. 9, the driver circuit 521 of the present exemplary embodiment is provided separately from the optical device 511 and is connected via a wiring cable 530. Meanwhile, the driver circuit 521 may be connected to an external spectral analyzer via the wired cable 540 to transmit information detected by the optical device 511 to the external spectral analyzer or receive a control command from the external spectral analyzer. The optical device 511 and/or the driver circuit 521 may include a power switch or other control buttons that may be operated by a user. Also, the optical device 511 and/or the driver circuit device 521 may further include a display or a display lamp capable of displaying a control state. The driver circuit 521 may or may not have its own built-in battery. In the absence of a built-in battery, power may be supplied to the spectrometer 501 through the wired cable 540.

Figure 11:
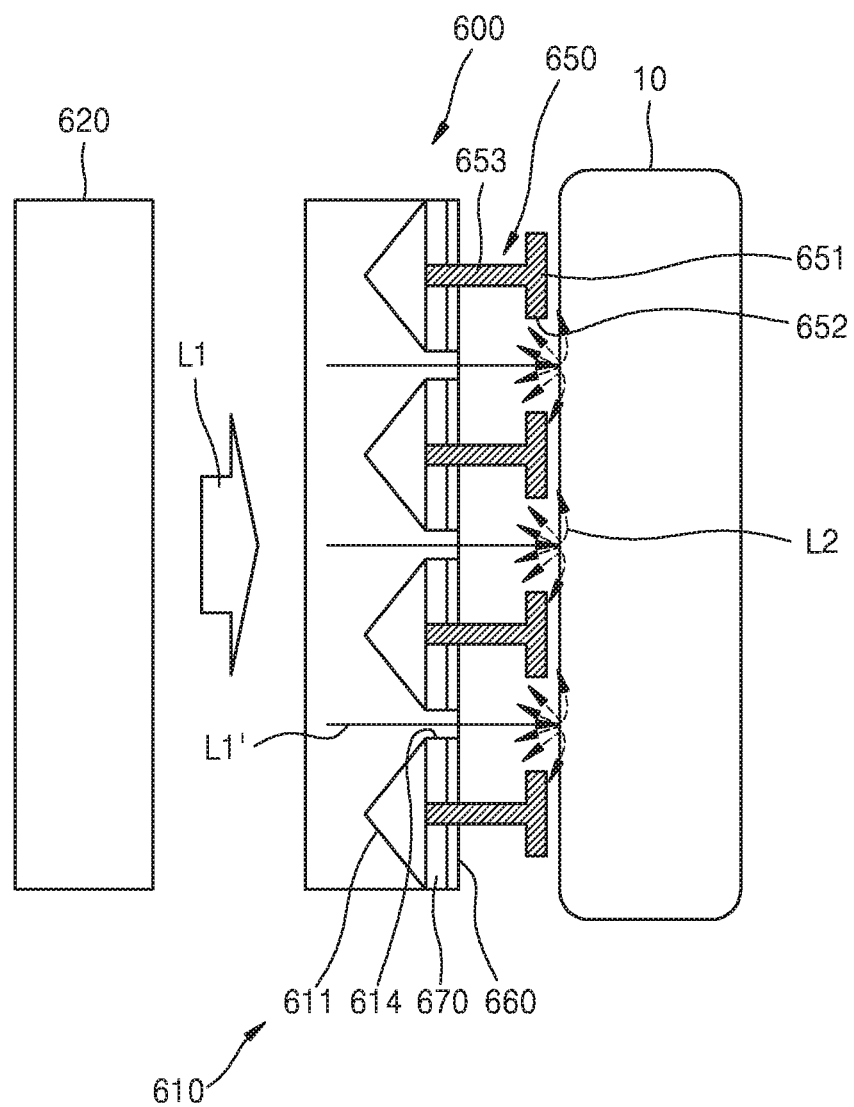
FIG. 11 is a schematic view of a spectrometer according to another exemplary embodiment.
Figure 12:
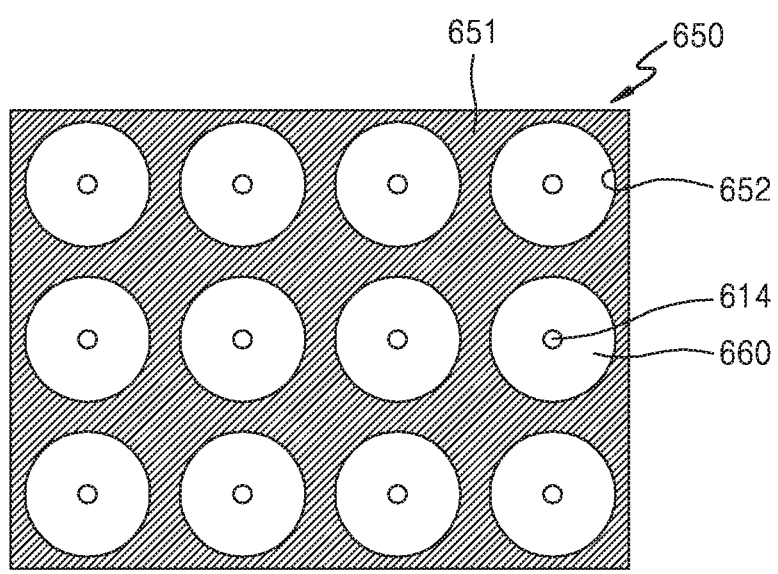
FIG. 12 is a front view of the spectrometer of FIG. 11.
Figure 13:
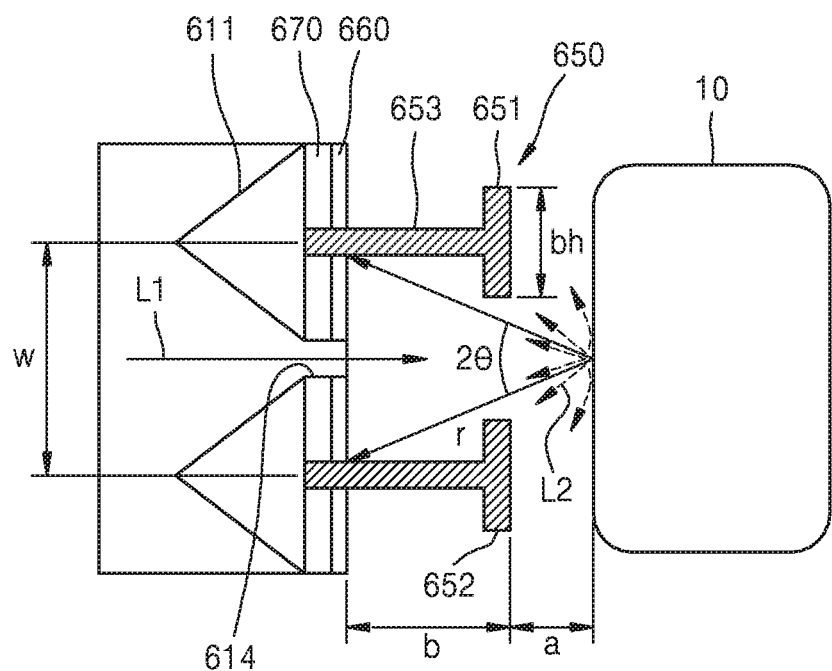
FIG. 13 is a view for explaining an operation of the spectrometer of FIG. 11.

FIG. 11 is a schematic view of a spectrometer 600 according to another exemplary embodiment. FIG. 12 is a front view of the spectrometer 600 of FIG. 11. FIG. 13 is a view for explaining an operation of the spectrometer 600 of FIG. 11.

Referring to FIGS. 11 through 13, the spectrometer 600 of the present exemplary embodiment includes a light source 620, a beam block 650, a filter array 660, and a detector array 670.

The beam block 650, the filter array 660 and the detector array 670 are supported by a support member 610. The support member 610 may have a planar structure.

The light source 620 is disposed on a back surface 611 of the support member 610. The light source 620 may be attached to or spaced from the back surface 611 of the support member 610. The light source 620 radiates the light L1 onto the back surface 611 of the support member 610. The light source 620 may be a surface light source corresponding to the back surface 611 of the support member 610 by itself or in combination with a light guide plate. The light source 620 may be a light source that emits the light L1 of a specific wavelength, a narrowband wavelength, or a wideband wavelength. In FIG. 11, the light source 620 is illustrated as being disposed directly behind the support member 610, but the present exemplary embodiment is not limited thereto. For example, the support member 610, the light source 620, and the target 10 may be disposed in a manner illustrated in FIGS. 1 and 5.

The filter array 660 and the detector array 670 are disposed on a front surface of the support member 610. The detector array 670 includes a plurality of two-dimensionally arranged detector cells. Each of the detector cells may be an image sensor, a photodiode array, or a phototransistor array. The filter array 160 includes a plurality of two-dimensionally arranged filters. The filters of the filter array 660 are disposed on an incident surface of the detector cells of the detector array 670. The filters of the filter array 660 may have circular incidence surfaces. The detector cells of the detector array 670 may also have circular incidence surfaces. The filters of the filter array 660 and the detector cells of the detector array 670 are each provided with a through hole at a center thereof. The filters of the filter array 660 and the detector cells of the detector array 670 are arranged two-dimensionally on the support member 610.

The supporting member 610 is formed with two-dimensionally arranged through holes 614. The through holes 614 are formed to correspond to through holes formed in the filters of the filter array 660 and the detector cells of the detector array 670. An oblique reflection surface 612 may be additionally formed in the vicinity of the through holes 614 so as to direct the incident light L1 toward the through holes 614 as viewed from the back surface 611 of the support member 610. The light L1 incident through the back surface 611 of the support member 610 is emitted through the through holes 614 of the support member 610, the through holes formed in the detector cells of the detector array 670, and the through holes formed in the filters of the array 660.

The beam block 650 is provided on a front surface of the support member 710. The beam block 650 includes a block end 651 and a support 653 that supports the block end 651. The block end 651 is a member expected to be positioned adjacent to and in contact with the target 10 and defines openings 652 with a predetermined area. The openings 652 may have circular shapes. The openings 652 have a one-to-one correspondence with the filters of the filter array 660. An area of each of the openings 652 may be smaller than an area of each of the filters of the filter array 660. The light L1 emitted from the light source 62 through the openings 652 is radiated onto the target 10 and the light L2 scattered by the target 10 is incident into the beam block 650. The support 653 may have a barrier rib structure such that the scattered light L2 incident through the openings 652 is not directed toward the neighboring filters of the filter array 660. In other words, light paths may be provided between the filters of the filter array 660 and the openings 652 by the barrier rib structure of the support 653. A cross-sectional surface of the support 653 may, for example, have an array shape of circular or polygonal holes, where the circular or polygonal holes correspond to the light paths.

Referring to FIG. 13, the block end 651 may restrict the scattered light L2 that is scattered in all directions to a specific angle $\theta_c$ by restricting a size of the openings 652. The restriction angle $\theta_c$ of the scattered light L2 with respect to a distance a between the beam block 650 and the target 10, a length b of the beam block 650, a width bh of the block end 651, and a width w of the detector 670 may be obtained by the following Equation 1.

$$Bh = w - a^* \tan \theta_c \qquad \text{[Equation 1]}$$

As seen in the Equation 1 above, by restricting the size of the openings 652 of the beam block 650, the scattered light L2 incident on the detector 670 may be restricted to only light within the restriction angle $\theta_c$. A spectral characteristic of the detector 670 largely depends on an angle at which the scattered light L2 is incident on the detector 670. For example, within a range of 5 degrees, the scattered light L2 has a spectral characteristic similar to that of a vertical incidence, but when the scattered light L2 is incident at an angle of 20 degrees, a measured wavelength range changes, which deteriorates spectral performance. The spectrometer 600 of the present exemplary embodiment may prevent the deterioration of the spectral characteristic of the spectrometer 600 by restricting the angle at which the scattered light L2 is incident on the detector 670 by using the beam block 650.

In the exemplary embodiment described with reference to FIGS. 11 and 12, the case where the light source 620 is disposed outside the support member 610 is described as an example but the present disclosure is not limited thereto. As another example, the light source 620 may be located inside the support member 610.

In the exemplary embodiment described with reference to FIGS. 11 and 12, the case where the light source 620 is a surface light source radiating a light to the back surface 611 of the support member 610 is described as an example but the present disclosure is not limited thereto. The light source 620 may be a plurality of point light sources, where each point light source may be located in a hole of the detector 670.

In the exemplary embodiment described with reference to FIGS. 11 and 12, the case where the filter array 660 is attached to the incident surface of the detector 670 is described as an example but the present disclosure is not limited thereto. The filter array 660 may be spaced apart from the incident surface of the detector 670.

In the exemplary embodiment described with reference to FIGS. 11 and 12, the case where the openings 652 of the beam block 650, incident surfaces of the filters of the filter array 660, and incident surfaces of the detector cells of the detector array 670 are circular shapes is described as an example but the present disclosure is not limited thereto. As another example, only the openings 652 of the beam block 650 are circular shapes, and the filters of the filter array 660 and the detector cells of the detector array 670 may have square, triangular, hexagonal, oval incident surfaces, etc. Alternatively, the openings 652 of the beam block 650 may also have square, triangular, hexagonal, oval incident surfaces, etc.

Figure 14:
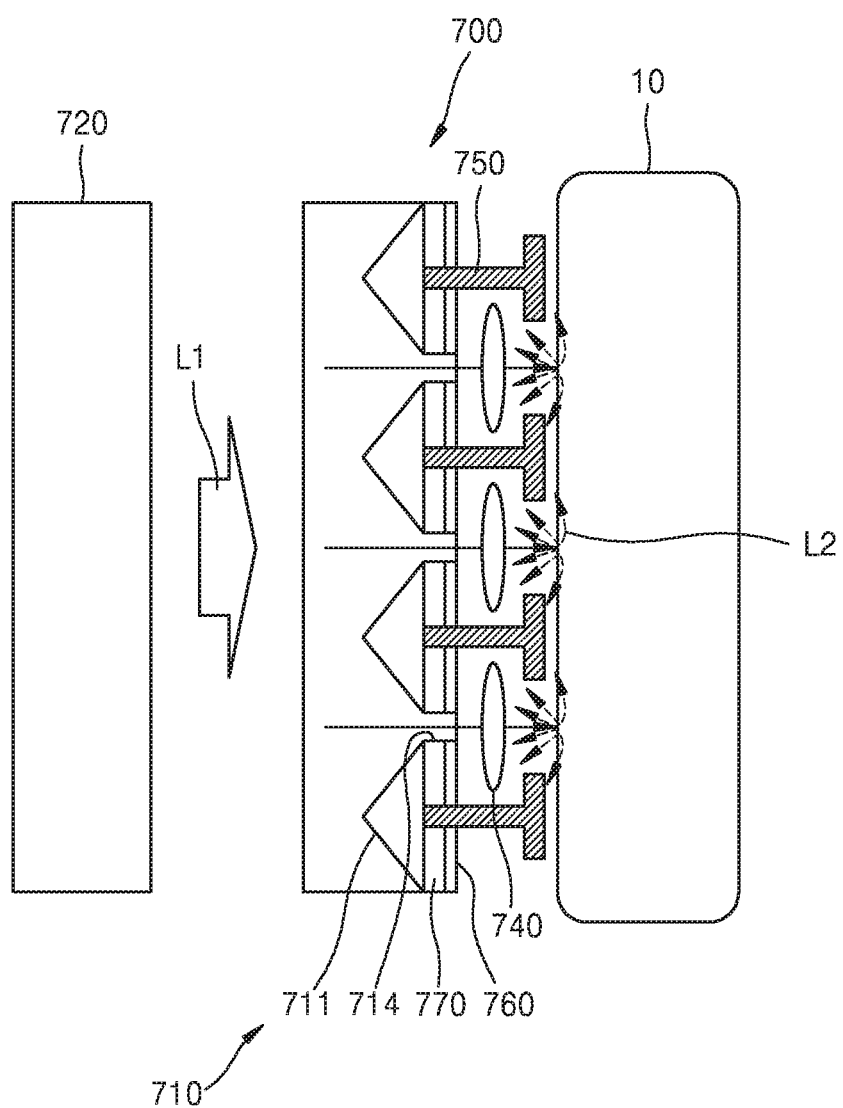
FIG. 14 is a schematic view of a spectrometer according to another exemplary embodiment.
Figure 15:
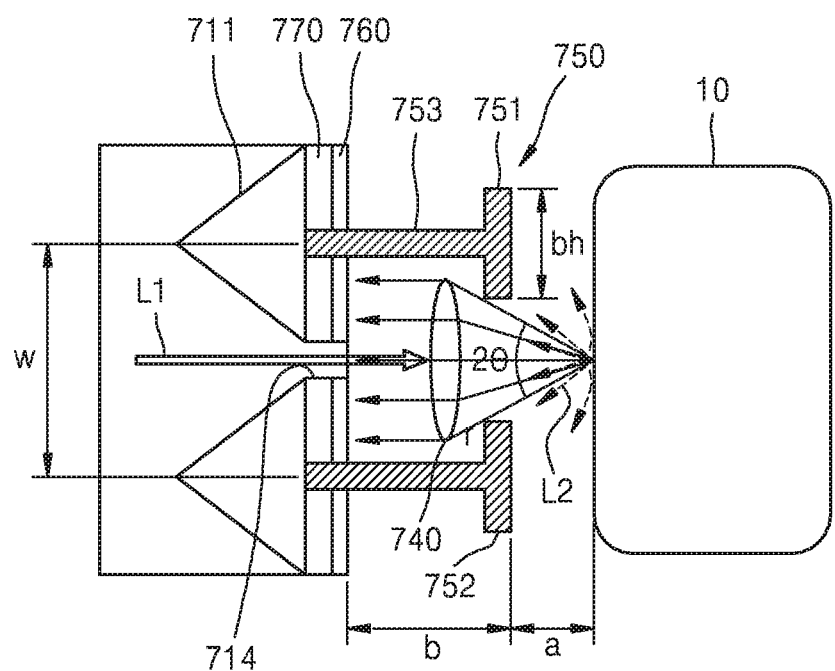
FIG. 15 is a view for explaining an operation of the spectrometer of FIG. 14.

FIG. 14 is a schematic view of a spectrometer 700 according to another exemplary embodiment. FIG. 15 is a view for explaining an operation of the spectrometer 700 of FIG. 14.

Referring to FIGS. 14 and 15, the spectrometer 700 of the present exemplary embodiment includes a back surface 711, through holes 714, a block end 751, openings 752, a support 753, a light source 720, a lens 740, a beam block 750, a filter array 760, and a detector array 770.

The lens 740, the beam block 750, the filter array 760 and the detector array 770 are supported by a support member 710. The light source 720, the beam block 750, the filter array 760 and the detector array 770 are substantially the same as the light source 620, the beam block 650, the detector array 660, and the detector array 670 of the spectrometer 600 described with reference to FIGS. 11 to 13, and thus redundant descriptions are omitted.

The beam block 750 includes a block end 751 and a support 753 that supports the block end 751. The support 753 may have a barrier rib structure that defines a light path as described with reference to FIGS. 11 to 13. The lens 740 may be disposed on the light path defined by the support 753. The lens 740 focuses the light L1 emitted from the light source 720 and aligns the scattered light L2 scattered by the target 10 as a collimated beam.

When the lens 740 is employed like the spectrometer 700 of the present embodiment, an angle at which the scattered light L2 is incident on the detector 670 may be further restricted, thereby further improving a spectral characteristic of the spectrometer 700.

Figure 16:
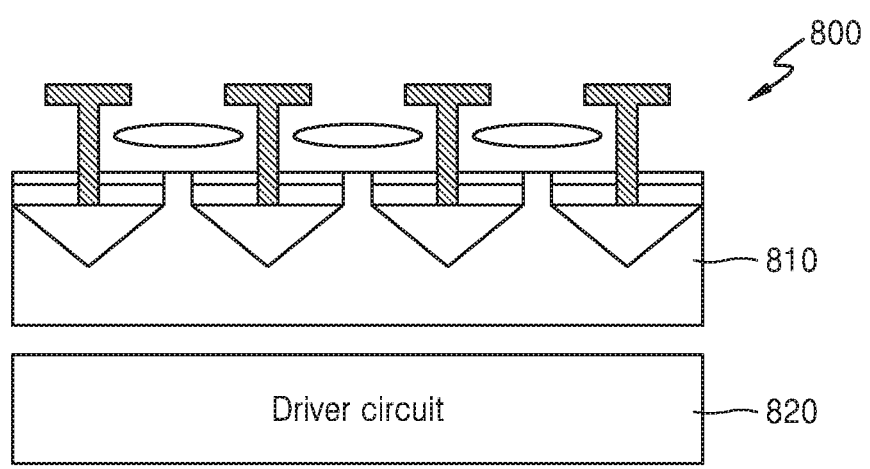
FIG. 16 is a schematic view of a spectrometer according to another exemplary embodiment.

FIG. 16 is a schematic view of a spectrometer 800 according to another exemplary embodiment. Referring to FIG. 16, the spectrometer 800 of the present embodiment may include an optical device 810 and a driver circuit 820 for driving the optical device 810. The optical device 810 may be a spectrometer of the embodiments described with reference to FIGS. 11 through 15. The optical device 810 and the driver circuit 820 may have a structure that the optical device 810 and the driver circuit 820 are mounted in one housing. As described above, the spectrometer of the exemplary embodiments described with reference to FIGS. 11 to 15 may have a flat plate structure, and thus the driver circuit 820 may be disposed on a back surface of the optical device 810 to provide a compact flat plate appearance. Further, the spectrometer 800 of the present embodiment may be integrated into an on-chip.

The spectrometer 800 may be connected to an external spectral analyzer in a wired or wireless manner to transmit information detected by the spectrometer 800 to the external spectral analyzer or receive a control command from the external spectral analyzer.

Figure 17:
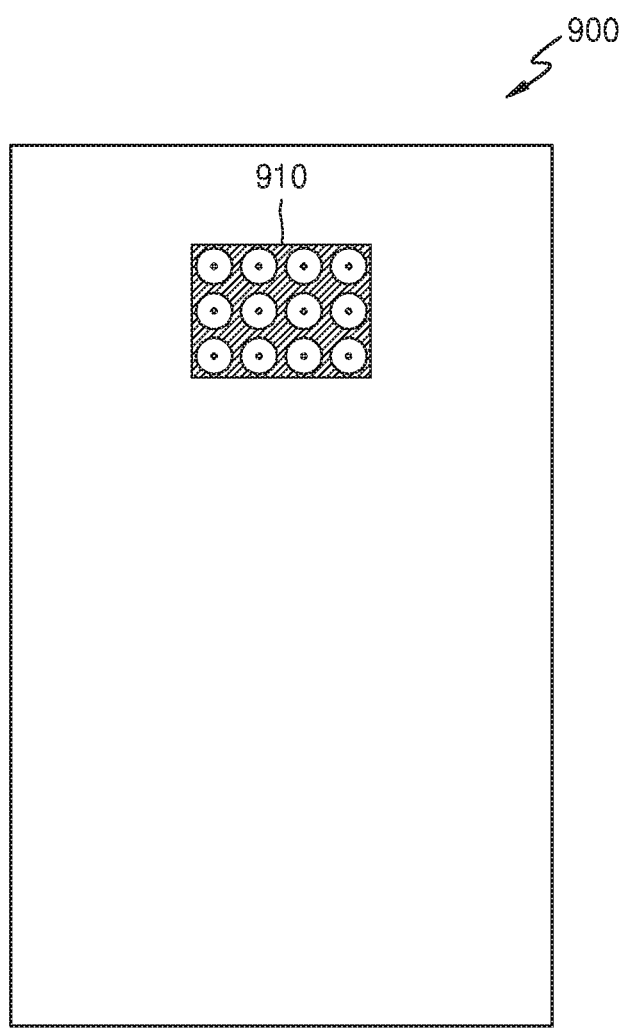
FIG. 17 is a schematic view of a spectroscopic system according to an exemplary embodiment.

FIG. 17 is a schematic view of a spectrometer system 900 according to an embodiment. The spectrometer system 900 of the present embodiment may be a portable device or a mobile device that includes a spectrometer 910. The spectrometer 910 may be a spectrometer of the embodiments described with reference to FIGS. 11 through 16. As described above, the spectrometer 910 may have a thin flat plate appearance and thus may be mounted on a small electronic device such as a portable device or a mobile device not to protrude or to slightly protrude therefrom.

Figure 18:
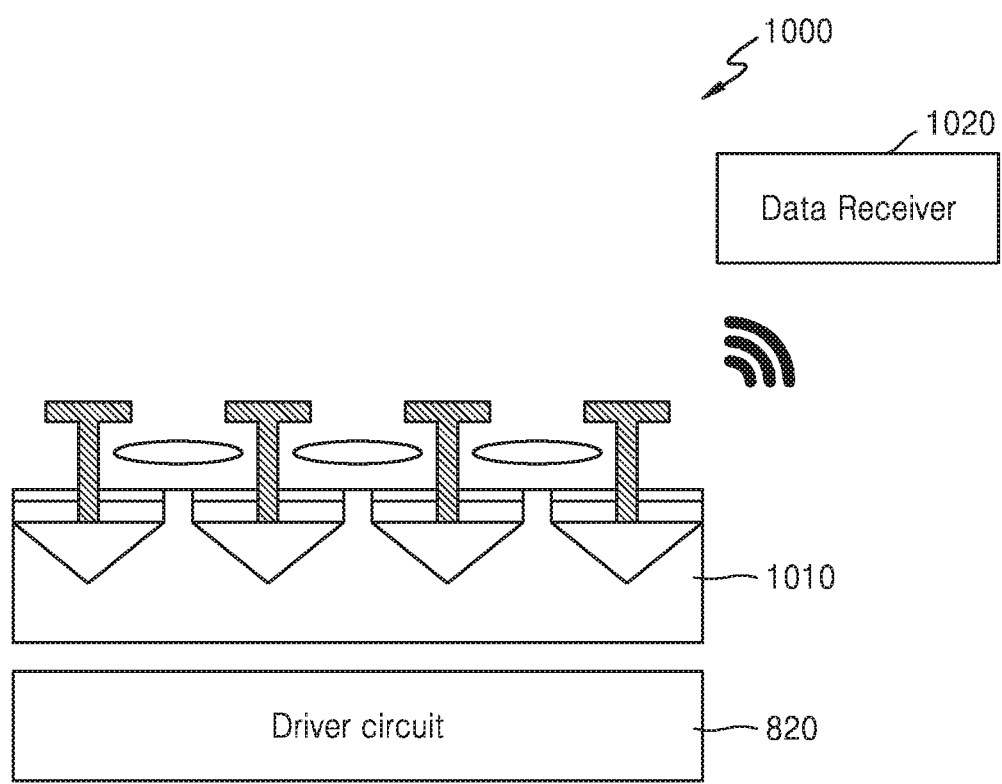
FIG. 18 is a schematic view of a spectroscopic system according to another exemplary embodiment.

FIG. 18 is a schematic view of a spectroscopic system 1000 according to another embodiment. Referring to FIG. 18, the spectroscopic system 1000 of the present embodiment includes a spectrometer 1010 and a data receiver 1020. FIG. 18 shows a spectrometer of the embodiment described with reference to FIG. 16, but is not limited thereto. The spectrometer 1010 may be a spectrometer of the embodiments described with reference to FIG. 9 or 10. The spectrometer 1010 may include a driver circuit and a wireless communication module. The spectrometer 1010 of the present embodiment may be integrated into an on-chip and may be operating as one independent device, or may be a device that wirelessly transmits data to the outside. For example, the spectrometer 1010 may be combined with the Internet of Things (IoT) technology. The data receiver 1020 wirelessly collects data detected in the spectrometer 1010. The data receiver 1020 may be a simple data collection device, but is not limited thereto. For example, the data receiver 1020 may be a spectral analyzer, a cloud server, a mobile phone, a laptop computer, a personal computer, a server, medical equipment, experiment equipment, and the like.

A spectrometer according to the embodiments is capable of accurately measuring light to be measured by aligning the light at a predetermined angle.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A spectrometer comprising:
a light source configured to emit a light to a target;
a light conduit comprising a measurement hole through which the light scattered by the target is incident, an inner surface configured to condense the light incident on the measurement hole into a collimated beam, and an output hole configured to output the light condensed by the inner surface;

a detector configured to detect the light output from the output hole of the light conduit; and a filter array comprising filters arranged on a detection surface of the detector and transmitting a predetermined wavelength band of the light output from the output hole of the light conduit.

2. The spectrometer of claim 1, wherein an inner surface of the light conduit is a hyperboloidal reflection surface.

3. The spectrometer of claim 2, further comprising: a lens disposed in a path of the light that is incident through the measurement hole.

4. The spectrometer of claim 1, wherein the inner surface of the light conduit is a parabolic reflection surface.

5. The spectrometer of claim 1, further comprising: a beam splitter configured to direct the light emitted from the light source toward the output hole of the light conduit and direct the light output from the output hole of the light conduit toward the detector.

6. The spectrometer of claim 5, wherein the beam splitter is a dichroic mirror or a dichroic prism.

7. The spectrometer of claim 1, wherein the light source is a narrowband wavelength light source or a wideband wavelength light source.

8. The spectrometer of claim 1, wherein the filter array comprises a nanostructure layer in which nanostructures are periodically arranged, and first and second reflective layers provided on a front surface and a back surface of the nanostructure layer, respectively.

9. The spectrometer of claim 1, wherein the detector is an image sensor, a photodiode array, or a phototransistor array.

10. The spectrometer of claim 1, further comprising a housing configured to mount the light source, the detector, and the filter array, wherein the light conduit protrudes from the housing and has a pen type appearance.

11. The spectrometer of claim 1, further comprising: a driver circuit configured to drive the light source and the detector.

12. The spectrometer of claim 1, further comprising: a wireless or wired communication module configured to communicate with an external electronic device.

13. A spectrometer system comprising:

a spectrometer of claim 12; and a data receiver configured to collect data received from the spectrometer.

14. The spectrometer system of claim 13, wherein the data receiver is a spectral analyzer, a cloud server, a mobile phone, a laptop computer, a personal computer, a server, medical equipment, or experiment equipment.

* * * * *